United States Patent [19]

Farrar et al.

[11] Patent Number: 4,675,119

[45] Date of Patent: Jun. 23, 1987

[54] AQUEOUS DRILLING AND PACKER FLUIDS

[75] Inventors: David Farrar; Brian Dymond, both of West Yorkshire, United Kingdom

[73] Assignee: Allied Colloids Limited, England

[21] Appl. No.: 761,953

[22] Filed: Aug. 2, 1985

Related U.S. Application Data

[63] Continuation-in-part of Ser. No. 641,901, Aug. 20, 1984, abandoned, and Ser. No. 672,308, Nov. 16, 1984, Pat. No. 4,554,307, and Ser. No. 612,516, May 21, 1984, Pat. No. 4,507,422.

[30] Foreign Application Priority Data

Aug. 3, 1984 [GB] United Kingdom ........... 8419805

[51] Int. Cl.⁴ ................................. C09K 7/02
[52] U.S. Cl. .............................. 252/8.514; 252/8.51; 252/8.551
[58] Field of Search ............ 252/8.5 A, 8.5 C, 8.55 R, 252/8.51, 8.514

[56] References Cited

U.S. PATENT DOCUMENTS

| | | | |
|---|---|---|---|
| 2,911,365 | 11/1959 | Burland et al. | 252/8.5 |
| 2,913,437 | 11/1959 | Johnson | 252/8.5 |
| 3,332,872 | 7/1967 | Oakes | 252/8.5 |
| 3,730,900 | 5/1973 | Perricone et al. | |
| 3,759,860 | 9/1973 | Peaker | |
| 3,794,608 | 2/1974 | Evani et al. | |
| 3,840,487 | 10/1974 | Dyson et al. | |
| 3,898,037 | 8/1975 | Lange et al. | 252/395 X |
| 4,267,093 | 5/1981 | Hanisch et al. | |
| 4,293,427 | 10/1981 | Lucas et al. | 252/8.5 |
| 4,419,466 | 12/1983 | Hopkins | |
| 4,450,013 | 5/1984 | Hirsch et al. | 106/308 N |
| 4,476,029 | 10/1984 | Sy | 252/8.5 |
| 4,502,964 | 3/1985 | Giddings | 252/8.5 |
| 4,502,965 | 3/1985 | Giddings | 252/8.5 |
| 4,507,422 | 3/1985 | Farrar et al. | 524/447 X |

FOREIGN PATENT DOCUMENTS

| | | |
|---|---|---|
| 0068887 | 5/1983 | European Pat. Off. |
| 0108842 | 5/1984 | European Pat. Off. |
| 1414964 | 11/1975 | United Kingdom |
| 1505555 | 3/1978 | United Kingdom |
| 2070108 | 9/1981 | United Kingdom |
| 2109363 | 6/1983 | United Kingdom |

*Primary Examiner*—Herbert B. Guynn
*Attorney, Agent, or Firm*—Ostrolenk, Faber, Gerb & Soffen

[57] ABSTRACT

Sulphonated polymers and copolymers are used as thinners in aqueous drilling or packer fluids. The sulphonated polymer has polydispersity below 2 and has a low solution viscosity. It is generally a copolymer of beta-acrylamidoalkane sulphonate or allyl sulphonate or other aliphatic sulphonate with an ethylenically unsaturated carboxylic acid, generally acrylic acid.

15 Claims, No Drawings

AQUEOUS DRILLING AND PACKER FLUIDS

This application is a continuation in part of U.S. Ser. No. 641,901 filed 20th Aug. 1984 (now abandoned), U.S. Ser. No. 672,308 filed 16th Nov. 1984 (now U.S. Pat. No. 4,564,387) and U.S. Ser. No. 612,516 filed 21st May 1984 (now U.S. Pat. No. 4,507,422).

Aqueous drilling and packer fulids consist of an aqueous phase in which inorganic particulate material is or may be dispersed and that usually contains dissolved organic additives. The inorganic particulate material often includes a colloidal clay such as bentonite and, during use, drill cuttings. The organic additives will be selected having regard to the properties required of the drilling or packer fluid. They generally fall into three classes. One class of additives are thinners, gel preventers or dispersants, and these serve to reduce viscosity or prevent undesirable increases in viscosity, such as those caused by an increase in suspended solids, coagulation by intrusion of inorganic salts such as sodium chloride or hydroxide or polyvalent metal ions, temperature effects on pre-hydrated bentonite and thermal degradation of other organic additives in the fluid.

Another class of additives are thoe known as fluid loss additives or filtration control agents. These are intended to promote the formation of a filter cake downhole or influence its permeability. The materials used as fluid loss additives are different from those used as thinners and different materials are required to achieve the different properties. A third class are viscosifiers.

Fluid loss additives are usually relatively high molecular weight water soluble polymers that may be cross-linked to increase their effectiveness. Solutions of the polymer will have a high viscosity. In U.S. Pat. No. 4,293,427, it is proposed to use optionally cross-linked copolymers of acrylamide and acrylamido alkyl sulphonic acid for this purpose. In U.S. Pat. No. 4,309,523, it is proposed to use copolymers of 2-acrylamido-2-methylpropane-sulphonic acid (AMPS) trademark with a N-vinyl-N-methyl acetamide and optionally acrylamide. In PCT Patent Publication No. WO83/02449, copolymers of AMPS and vinylimidazole and a cross-linking agent are described as fluid loss additives. The relatively high molecular weight of such polymers is indicated by the viscosities mentioned in U.S. Pat. No. 4,293,427 and by the relatively high K values in U.S. Pat. No. 4,309,523 and PCT No. WO83/02449.

In U.S. Pat. No. 4,502,964, fluid loss additives are described which are copolymers of at least 51 mole percent AMPS together with dimethyl acrylamide and acrylonitrile. They are said to have molecular weights up to 1 million, preferably up to 500,000, and the example shows a solution having a Brookfield viscosity of 96,000 cps. It is stated that the molecular weight may be down to 10,000, but this must be a typographical error as molecular weights as low as this are unlikely to provide fluid loss properties even when the polymer does contain significant amounts of acrylonitrile. A similar disclosure exists in U.S. Pat. No. 4,502,965 except that the exemplified Brookfield viscosity is 2,940 cps and the dimethyl acrylamide is replaced by vinyl pyrrolidone.

Solutions of fluid loss additives must have a relatively high viscosity and/or promote filter cake formation of the mud thinners have to generate very low viscosity. Thinners for drilling and packer fluids therefore have to be dispersants for the clay and other particles in the muds.

Synthetic polymers that will act as dispersants are well known. For instance, low molecular weight sodium polyacrylates have been widely used, typically having molecular weights up to 10,000 or more. In U.S. Pat. No. 3,898,037, copolymers of AMPS with acrylic acid or other monomers are proposed and are said to have molecular weight ranges preferably from 10,000 to 100,000 although they can be higher or lower. Polydispersity is weight average molecular weight divided by number average molecular weight and is an indication of the spread of molecular weights within a polymer, a polydispersity of 1 being the theoretical optimum where all polymer chains have the same molecular weight. It is apparent that the polydispersity values of the polymers in U.S. Pat. No. 3,898,037 will inevitably be very high, probably above 3. Most of the exemplified polymers contain 70% by weight AMPS but some have only 30%.

Although thinners for drilling and packer fluids must be dispersants, they must also meet various other performance requirements in order that they are suitable as downhole thinners and there have been numerous publications in the literature of suitable thinning systems. For instance, in U.S. Pat. No. 2,911,365 and U.S. Pat. No. 4,476,029 various polyacrylates are used and in U.S. Pat. No. 2,913,437 olefin maleic anhydride copolymers are used. Generally the molecular weight of thinners is lower than the values that are preferred as dispersants in U.S. Pat. No. 3,898,037.

In U.S. Pat. No. 3,730,900 it is proposed to use styrene sulphonic acid maleic anhydride copolymers having molecular weights between 1,000 and 5,000. Such products have been used extensively under the Trade Name "Miltemp". In U.S. Pat. No. 3,764,530 and in British Pat. No. 2,120,708, it is proposed to use various acrylic acid polymers. In British Pat. No. 2,090,888, it is proposed to use a copolymer of acrylic acid and hydroxypropyl acrylate.

In U.S. Pat. No. 4,048,077, it is proposed to add relatively high molecular weight (as indicated by K value) copolymers of, for instance, vinyl sulphonic acid, acrylamide and N-vinyl-N-methyl acetamide to drilling fluid for an unspecified purpose. The effectiveness of these additives was determined by measuring water loss and so presumably they are intended as fluid loss additives. It was stated that the presence of sulpho. amide, nitrile and ester groups increase the stability of the polymers towards calcium ions but the formation of carboxl groups increases the sensitivity of the polymers to calcium ions.

Low molecular weight polyacrylic acid and low molecular weight styrene sulphonic acid maleic anhydride copolymers are reasonably satisfactory as thinners in many drilling and packer fluids. However they do not always maintain the quality of dispersion that is required in deep wells and, in particular, problems arise when the fluid has a high content of dissolved calcium, for instance when the drilling fluid is a gypsum or lime mud or a mud contaminated with cement or anhydrite.

We have now found that improved results can be obtained in drilling and packer fluids, particularly in those containing substantial quantities of dissolved calcium, if the fluid contains, as thinner, a water soluble polymer having a viscosity (Brookfield Viscometer, Model RVT, Spindle No. 1, speed 20 rpm 15% by weight active polymer at 20° C.) of below 300 cps and a polydispersity below 2.0 and formed of (a) 1 to 100% by weight ethylenically unsaturated compound having a sulphonate group substituted onto an aliphatic carbon atom, (b) 0 to 99% by weight ethylenically unsaturated carboxylate and (c) 0 to 20% by weight non-deleterious, inert ethylenically unsaturated monomer. The sulphonate and carboxylate groups may be present as free acid groups or as water soluble salts, for instance ammonium or sodium or other alkali metal salts.

The thinner used in the invention must have a Brookfield viscosity of below 300 cps when measured as defined above. Preferably the polymer has a Brookfield viscosity below 100 and most preferably below 50 cps. Best results are generally obtained at 1 to 20 cps. If the Brookfield viscosity is significantly above these values, the polymer will not act as a thinner but may instead tend to serve as a fluid loss additive.

The low viscosity value results, at least in part, from the molecular weight of the polymer. If the molecular weight is too high, the viscosity will be too high and the polymer will not serve as a thinner. The molecular weight must always be well below 50,000 and usually well below 20,000 and normally below 10,000. It is normally above 500. The molecular weight is preferably in the range 1,000 to 8,000, most preferably 1,000 to 6,000. Best results are generally obtained with molecular weights in the range 2,000 to 4,500.

It is essential that the polydispersity of the polymer should be below 2 and so conventional, high polydispersity, polymers such as thoe proposed as dispersants in U.S. Pat. No. 3,898,037 and as thinners in U.S. pat. No. 3,730,900 (typically having polydispersities of 2.5, 3 or more) are less satisfactory. The polydispersity must be below 2 and is preferably below 1.8. It can be as low as 1.05 but it is generally satisfactory to use polymers having polydispersities of, typically, 1.35 to 1.6. Particularly good results are obtained when the polydispersity is below 1.5.

Monomer (a) must have the sulphonate group substituted onto an aliphatic carbon as substitution onto an aromatic carbon, for instance as in styrene sulphonate, appears to be unsatisfactory. Generally the monomer is aliphatic and may be selected from allyl sulphonate, sulphonated alkyl vinyl ester and, preferably, beta-acrylamidoalkane sulphonates such as AMPS and APPS (wherein the methyl of AMPS is replaced by phenyl). The preferred monomers are AMPS and allyl sulphonic acid (both usually as the sodium salt).

The ethylenically unsaturated carboxylic acid (b) may be, for instance, maleic acid, itaconic acid, methacrylic acid or, preferably, acrylic acid.

The comonomer (c) can be any monomer that will copolymerise wih monomers (a) and (b) and whose presence is not deleterious to the copolymer. Examples are acrylamide, methacrylamide, and methyl acrylate.

All the monomers used for making the polymers are preferably water soluble.

It is generally preferred that copolymer (c) is absent but, if present, the amount is preferably below 10%, and most preferably below 5% by weight. The present of large amounts of, for instance, acrylonitrile or other comonomers as proposed in, for instance, the fluid loss additives of U.S. Pat. No. 4,502,964 and U.S. Pat. No. 4,502,965 is undesirable in the present invention since it impairs the thinning and dispersing properties of the polymers.

It is generally necessary that at least 10% by weight of the monomers should be sulphonate monomers. It is generally preferred that monomer (b) is present, so that the polymer is a copolymer, with amounts of 10 to 60% (a) and 40 to 90% (b) generally being preferred. Best results are generally obtained in the range 10 to 50% by weight (a) and 50 to 90% by weight (b). Generally the amount of (a) is below 45%. If the objective is cost effectiveness, then the preferred ratios are up to 29% (e.g., 18 to 29%) (a) and down to 71% (e.g., 71 to 82%) (b) but if the objective is maximum stability to the presence of dissolved calcium, irrespective of extra polymer cost, the preferred ratios are 30 to 45% (a) and 70 to 55% (b). Generally it is best for the amount of sulphonate monomer to be below 25%, often 10 to 22%, by weight. For instance particular good results are obtained using 15 to 25, often 18 to 22% by weight AMPS or 7 to 18, often 8 to 15%, by weight allyl sulphonate (both as sodium salt), generally copolymerised with acrylic acid.

The preferred copolymers are copolymers of AMPS or allyl sulphonic acid with acrylic acid within these ranges and having a molecular weight preferably in the range 1,000 to 8,000, preferably 1,000 to 6,000 and a polydispersity below 1.8, preferably in the range 1.35 to 1.6.

The homopolymers and copolymers used in the invention can readily be made by conventional processes known for polymerising water soluble monomers to form low molecular weight, low polydispersity, water soluble polymers, for instance solution polymerisation under controlled temperature conditions in a solvent consisting of water and isopropanol. The manufacture of water soluble dispersant polymers having low polydispersity is described in U.S. Pat. No. 4,507,422 and techniques such as those described therein may be used for producing the polymers that are preferred for use in the present invention.

The specified polymer should be present in an effective thinning amount, which is usually 0.5 to 30 g/l, most preferably 0.5 to 3 g/l. It may be used in combination with another thinner, for instance a lignosulphonate thinner, but preferably is the only thinner in the fluid.

The fluid may include other components that are conventional in drilling and packer fluids. Examples are fluid loss additives and other conventional dissolved organic additives. The fluid generally includes inorganic particles. These may be or include drilled rock particles that are being carried by the fluid. Generally the fluid includes suspended clay particles, for instance bentonite or other colloidal clay, generally in amounts of from 25 to 150 g/l. The fluid may contain a weighting agent such as barites, typically in amounts of from 100 to 1,000 g/l.

The invention is of particular value when the fluid contains dissolved calcium, generally in amounts of at least 0.25 grams dissolved calcium per liter of fluid, typically 0.5 to 10 g/l. For instance, the fluid may contain 2 to 30 g/l calcium hydroxide or sulphate or other calcium compound that can contribute dissolved calcium.

The following are examples of the invention.

EXAMPLE 1

A weighted freshwater gypsum mud was formulated from 70 g/l pre-hydrated Wyoming bentonite, 630 g/l barites and 11.5 g/l gypsum. Various amounts of different thinners were added. Thinner A was sodium polyacrylate having a molecular weight in the range 2,000 to 3,000. Thinner B is a copolymer of 20 weight percent AMPS sodium salt and 80 weight percent sodium acrylate having polydispersity 1.5 and molecular weight about 3800. Thinner C is a copolymer of 40 weight percent AMPS sodium salt and 60 weight percent sodium acrylate, having polydispersity 1.46 and molecular weight about 3250. Thinner D is ferro-chrome lignosulphonate. Thinners B and C have Brookfield viscosity (measured as stated above) of below 20 cps.

Reduction in shear thinking rheology is exemplified by yield point (YP) values derived from viscosity measurements using a Fann Model 35SA viscometer. In the following table, the YP values and the 10 second gel values are both quoted in Pa and the dosage is quoted in g/l.

TABLE 1

| Thinner | Dosage | YP | 10 Second Gel |
|---|---|---|---|
| None | 0 | 18 | 14 |
| A | 0.57 | 13 | 11 |
| A | 1.14 | 7 | 9 |
| A | 2.28 | 4 | 5 |
| A | 3.42 | 3 | 2 |
| A | 5.7 | 3 | 2 |
| B | 0.57 | 9 | 6 |
| B | 1.14 | 4 | 3 |
| B | 2.28 | 1 | 1 |
| B | 2.85 | 1 | 1 |
| C | 0.57 | 9 | 6 |
| C | 1.14 | 3 | 2 |
| C | 2.28 | 1 | 1 |
| C | 2.85 | 1 | 1 |
| D | 1.4 | 15 | 14 |
| D | 2.85 | 9 | 5 |
| D | 5.7 | 3 | 4 |
| D | 11.4 | 2 | 2 |

The lower yield points and gel strengths achievable by polymers B and C, of the invention, at equivalent dosages demonstrates the advantages of these polymers over the commercially utilised materials A and D.

A similar advantage is also obtainable when the pH of the fluid is adjusted to pH 11, this being a common mud condition and being typical for muds containing ligno-sulphonates. The corresponding values are given in Table 2 below.

TABLE 2

| Thinner | Dosage | YP | 10 Second Gel |
|---|---|---|---|
| None | 0 | 62 | 37 |
| A | 0.57 | 29 | 21 |
| A | 1.14 | 9 | 21 |
| A | 2.28 | 7 | 26 |
| B | 0.57 | 15 | 20 |
| B | 1.14 | 2 | 6 |
| B | 2.28 | 1 | 1 |
| C | 0.57 | 11 | 16 |
| C | 1.14 | 2 | 5 |
| C | 2.28 | 1 | 2 |
| D | 1.42 | 50 | 31 |
| D | 2.85 | 29 | 20 |
| D | 5.7 | 2 | 4 |
| D | 8.55 | 0 | 1 |

EXAMPLE 2

Muds formulated as in Example 1 were subject to aging for 16 hours at 232° C., cooled to room temperature and their physical condition examined for their relative degree of fluidity. The muds were then remixed by Hamilton Beach mixer for 5 minutes and their rheology measured by Fann viscometer Model 35SA. To further assess the effect of temperature cycling as would be experienced by mud cycling downhole, the viscosity of each mud sample was measured at 204° C. using a Fann Viscometer Model 50.

The results shown in Table 3 were observed. In these, the dosage is in grams per liter, the PV, YP and 10 second and 10 minute gel values are recorded on the Fann 35 data, PV being in cp and the YP and gel values being in Pa and the other viscosity values are all recorded in cp. IV is the initial viscosity in cp. FT is the floc temperature in 20° C. in which the viscosity reaches a minimum on heating. T40 is the temperature in 20° C. at which the viscosity reaches 40 cp on heating. Peak is the peak viscosity in cp and is usually reached prior to maximum temperature. MCV is the minimum viscosity in cp shown on cooling. V65 is the viscosity at 65° C., this being the mud pit temperature. Muds shown a tendency to gel after cooling, as shown by a steady rise in viscosity and comparison of V65 with V32, the viscosity at 32° C. in cp, is indicative of this.

The results show that B, including AMPS, is better than the acrylate A but that increasing the amount of AMPS, as in C, improves the measured results.

TABLE 3

| Product | Dosage | PV | YP | 10 Sec Gel | 10 Sec Aged Gel | pH | Condition After Aging | IV | FT | T40 | Peak | MCV | V65 | V32 |
|---|---|---|---|---|---|---|---|---|---|---|---|---|---|---|
| Untreated | 0 | 14 | 46 | 34 | 35 | 7.9 | Gelled Solid | 315 | 73 | — | 400 | 25 | 75 | 122 |
| A | 0.28 | 17.5 | 13 | 7 | 18 | | Gelled Solid | | | | | | | |
| A | 0.85 | 40 | 43 | 17 | 37 | 8.6 | Gelled Solid | 255 | 148 | — | 147 | 143 | 179 | 228 |
| A | 1.43 | 25 | 21 | 8 | 25 | 8.3 | Gelled Solid | 143 | 129 | 69 | 85 | 33 | 33 | 80 |
| A | 2 | 31 | 81 | 54 | 58 | 7.6 | Gelled Solid | | | | | | | |
| A | 2.85 | 26 | 80 | 55 | 51 | | Gelled Solid | | | | | | | |
| B | 0.28 | 21 | 12 | 5 | 18 | 8.6 | Lumpy Fluid | 133 | 192 | — | 355 | 86 | 97 | 122 |
| B | 0.85 | 34.5 | 8 | 1 | 8 | 7.5 | Lumpy Fluid | 51 | 126 | 67 | 257 | 38 | 42 | 48 |
| B | 1.43 | 26 | 7 | 1 | 9 | 8.4 | Lumpy Fluid | 67 | 120 | 62 | 248 | 22 | 22 | 45 |
| B | 2 | 22 | 17 | 3 | 17 | 8.6 | Lumpy Fluid | 100 | 144 | 84 | 52 | 26 | 26 | 59 |
| B | 2.85 | 21 | 18 | 8 | 20 | 8.2 | | 118 | 122 | 69 | 74 | 18 | 18 | 72 |
| C | 0.85 | 29.5 | 3 | 1 | 1 | 8.8 | Fluid | 33 | 148 | 120 | 57 | 29 | 33 | 33 |
| C | 1.43 | 25.5 | 1 | 1 | 1 | 8.5 | Fluid | 27 | 120 | 73 | 102 | 17 | 22 | 18 |

EXAMPLES 3

A weighted freshwater mud at 1.45 specific gravity (gcm$^{-3}$) containing 71 g/l Wyoming bentonite and barite was mixed and aged for 16 hours to pre-hydrate the clay. To this was added 17 g/l of a commercially available ferrochrome lignosulphonate and the pH then adjusted to 11. Where applicable, 6.8 g/l active dosage of additive was applied and the mud mixed for 30 minutes on a suitable mixer. The muds were aged for 16 hours at 93° C., cooled to room temperature and remixed for 5 minutes prior to making pH and rheology measurements (Fann 35SA data). The pH was readjusted to 11 and the muds again aged for 16 hours but at 232° C. After aging, the muds were retested as described above and API low temperature fluid loss measurements were obtained.

Various additives were tested. Additives B and C are in accordance with the invention, as in Example 1. Additives A and D are commercial additives, as in Example 1. Additive E is a commercially available copolymer of styrene sulphonic acid/maleic anhydride, presumably in accordance with U.S. Pat. No. 3,730,900.

The test is designed to show the effect of the thinners in resisting thickening and gelation due to drilling mud thermal ageing when the mud contains a ferrochrome lignosulphonate thinner and the additive is added to protect this thinner and to contribute to the thinning properties. The results are shown in Table 4.

TABLE 4

| Product | Temperature | pH | PV (cp) | YP (Pa) | AV (cp) | 10 Sec gel | 10 Min gel | Condition After Aging |
|---|---|---|---|---|---|---|---|---|
| D | 93 | 9.2 | 38 | 0.5 | 38.5 | 2 | 3 | Fluid |
|   | 232 | 8.3 | 81 | 26 | 107.5 | 6 | 16 | Solid |
| A | 93 | 9.2 | 36 | 1 | 37 | 3 | 3 | Fluid |
|   | 232 | 8.3 | 90 | 31 | 122 | 6 | 10 | Fluid |
| E* | 93 | 8.7 | 37 | 1 | 38.5 | 3 | 3 | Fluid |
|   | 232 | 8.2 | 94 | 45 | 140 | 7 | 11 | Solid |
| B | 93 | 9.3 | 36 | 1 | 37 | 2 | 2 | Fluid |
|   | 232 | 8.2 | 76 | 17 | 94 | 4 | 6 | Fluid |
| C | 93 | 9.3 | 33 | 8 | 40 | 4 | 5 | Fluid |
|   | 232 | 7.5 | 92 | 25 | 118 | 5 | 9 | Fluid |

These results clearly demonstrate the superiority of the products of the invention, B and C, and in particular show that the styrene sulphonic acid/maleic anhydride copolymer is much less effective than the polymers defined in the invention.

EXAMPLE 4

Various muds were made using 25 parts bentonite, 220 parts barites, 4 parts calcium sulphate, 2 parts calcium hydroxide and 0.5 part of 40% aqueous sodium hydroxide, all parts being parts per barrel. Various amounts of different thinners were added. Thinner F was sodium acrylate homopolymer having molecular weight about 3,500 and polydispersity 1.6. Thinner G was 80:20 sodium acrylate:AMPS copolymer molecular weight about 3,500 and polydispersity 1.5. Thinner J was 12:88 sodium allyl sulphonate:sodium acrylate copolymer (molecular weight 3,310; polydispersity 1.56). Thinner K was 26:74 sodium allyl sulphonate:sodium acrylate copolymer (molecular weight 2,099; polydispersity 1.67). When the yield point and gel strength were measured as in Example 1 for muds containing thinners G and J, it was found that very similar results were obtained. When the shear strength was determined at rates of addition of 0.4, 1.2 and 2.0 parts per barrel active polymer, it was found that thinners G, J and K consistently gave a very much higher shear strength than thinner A. For instance at 0.4 parts per barrel, the shear strengths were F 420, G 110, J 42 and K 33 and at 2 parts per barrel the shear strength for F was 320 and the shear strength for G, J and K was below B 3 (LB. 100 FT−2). This demonstrates that sodium allyl sulphonate does, like AMPS, have very beneficial properties when included in a copolymer as a thinner.

We claim:

1. An aqueous fluid selected from drilling and packer fluids and containing, as thinner, an effective thinning amount of a water soluble polymer that has a viscosity of below 300 cps (Brookfield Viscometer, Model RVT, Spindle No. 1, speed 20 rpm, 15% by weight active polymer solution at 20° C.) and a polydispersity below 2.0 and that is formed from (a) 10 to 60% by weight 2-acrylamido-2-methyl propane sulphonic acid and (b) 40 to 90% by weight acrylic acid, wherein the acid groups are selected from free acid groups and ammonium and alkali metal salts thereof, and having a molecular weight of 1,000 to 8,000, said fluid 25 to 150 g/l colloidal clay 2. A fluid according to claim 1 in which the polymer has a polydispersity below 1.8.

3. A fluid according to claim 1 in which the polymer has a molecular weight below 6,000.

4. A fluid according to claim 1 in which the polymer has a polydispersity below 1.6.

5. A fluid according to claim 1 in which the amount of (a) is 10 to 25% by weight and the amount of (b) is 75 to 90% by weight.

6. A fluid according to claim 1 in which the copolymer has a molecular weight of 1,000 to 6,000, and is a copolymer of 10 to 45% by weight of 2-acrylamido-2-methyl-propane sulphonic acid, sodium salt and 55 to 90% by weight sodium acrylate.

7. A fluid according to claim 1 containing at least 0.25 g/l dissolved calcium.

8. A fluid according to claim 1 in which the polymer is formed from 18 to 22% by weight 2-acrylamido-2-methyl propane sulphonic acid sodium salt and 78 to 82% by weight sodium acrylate and has a molecular weight of 2,000 to 4,500.

9. A fluid according to claim 1 in which the amount of said thinner is from 0.15 to 30 g/l.

10. A fluid according to claim 1 in which said viscosity is below 50 cps.

11. A fluid according to claim 1 further including inorganic particulate selected from the group consisting of drilled rock particles and 100 to 1000 g/l weighting agent and combinations thereof.

12. An aqueous fluid selected from drilling and packer fluids and containing 25 to 150 g/l colloidal clay and, as thinner, an effective thinning amount of a water soluble polymer that has a viscosity below 300 cps (Brookfield Viscometer, Model RVT, Spindle No. 1, speed 20 rpm, 15% by weight active polymer solution at 20° C.) and a polydispersity below 2 and a molecular weight from 2000 to 4500 and that is formed from 15 to 25% by weight 2-acrylamido-2-methyl propane sulphonic acid sodium salt and 85 to 75% by weight sodium acrylate.

13. A fluid according to claim 12 in which the polymer has a polydispersity below 1.8.

14. A fluid according to claim 13 in which the polymer has a polydispersity from 1.35 to 1.6.

15. A fluid according to claim 14 in which the amount of 2-acrylamido-2-methyl propane sulphonic acid sodium salt is 20 weight %.

* * * * *

UNITED STATES PATENT AND TRADEMARK OFFICE
CERTIFICATE OF CORRECTION

PATENT NO. : 4,675,119

DATED : June 23, 1987

INVENTOR(S) : David Farrar et al.

It is certified that error appears in the above-identified patent and that said Letters Patent is hereby corrected as shown below:

Column 8, line 15, for "fluid 25" read —fluid containing 25—.

Signed and Sealed this

Seventeenth Day of November, 1987

Attest:

DONALD J. QUIGG

Attesting Officer

Commissioner of Patents and Trademarks